United States Patent [19]
Moseley

[11] Patent Number: 5,333,340
[45] Date of Patent: Aug. 2, 1994

[54] MOBILE TRUCK FREIGHT DOCK WITH IMPACT AND RESTRAINT MEANS

[76] Inventor: John F. Moseley, 767 N. Beach St., Ormond Beach, Fla. 32174

[21] Appl. No.: 15,146

[22] Filed: Feb. 9, 1993

[51] Int. Cl.⁵ .................. B65G 69/22; B65G 69/28
[52] U.S. Cl. ........................... 14/72.5; 414/343; 414/401; 414/537; 414/573
[58] Field of Search ............ 14/69.5, 70, 71.1, 71.3, 14/71.5, 71.7, 72.5, , 42, 47; 182/141; 414/350, 401, 402, 495, 537, 396, 584, 343, 573; 187/9 R, 18; 114/362, 230; 188/7; 280/186, 188; 119/122; 244/115; D34/28

[56] References Cited

U.S. PATENT DOCUMENTS

| | | | |
|---|---|---|---|
| 3,489,300 | 1/1970 | McCartney et al. | 414/343 X |
| 4,127,856 | 11/1978 | Bickel | 14/71.1 X |
| 4,488,326 | 12/1984 | Cherry | 14/69.5 X |
| 4,493,282 | 1/1985 | Ortloff | 114/230 |
| 4,627,375 | 12/1986 | Davis et al. | 114/230 |
| 4,767,254 | 8/1988 | Kovach et al. | 14/71.1 X |
| 4,867,277 | 9/1989 | Sloan | D34/28 X |
| 5,013,204 | 5/1991 | Leon | 414/495 X |
| 5,082,415 | 1/1992 | Hayashi | 414/401 X |
| 5,097,770 | 3/1992 | Miyashita et al. | 414/537 |

FOREIGN PATENT DOCUMENTS 0105976  4/1984  European Pat. Off. ............ 114/230

OTHER PUBLICATIONS

"POWERAMP" Brochure, Systems Inc., Germantown, Wis.

Primary Examiner—Ramon S. Britts
Assistant Examiner—James A. Lisehora
Attorney, Agent, or Firm—Arthur C. Yeager; Earl L. Tyner

[57] ABSTRACT

Mobile elevatable platform devices are fitted with an impact absorbing bumper, a truck restraining hook mechanism, and, optionally, a ground anchor.

2 Claims, 6 Drawing Sheets

MOBILE TRUCK FREIGHT DOCK WITH IMPACT AND RESTRAINT MEANS

BACKGROUND OF THE INVENTION

Federal and state safety rules require that all trucks at freight loading docks be restrained during loading and unloading to prevent accidents caused by unexpected separation of the truck from the dock. Chocking the truck and trailer wheels has proven to be both ineffective and expensive. Various methods of truck restraint have been developed which attach and lock securely to the ICC bumpers on trucks. ICC bumpers and such restraints have been in use at loading/unloading dock areas for over eleven years.

Mobile platform docks are used for loading and unloading trucks and trailers at locations where truck docks are not available. Unexpected separation of mobile docks from trucks is a dangerous potential hazard which has not been given any serious attention prior to this time.

It is an object of this invention to provide a novel mobile truck dock. It is another object of this invention to provide a novel truck dock that incorporates means to absorb the impact of a truck backing into the dock, and to safely restrain the truck from unintentionally separating from the dock. Still other objects will appear from the more detailed description which follows.

BRIEF SUMMARY OF THE INVENTION

This invention relates to an improvement in mobile docks for trucks having an ICC bumper and the dock is a mobile elevatable platform apparatus including a front side with a first folding bridge adapted to form an access walkway between the truck and the platform and having another apparatus with a second folding bridge adapted to form an access walkway from the platform to a freight assembly surface. The improvement which comprises a truck impact absorbing bumper and a truck restraining hook mechanism attached to the front side of said apparatus and adapted respectively to receive the impact of a docking truck and to grasp the ICC bumper of said truck.

In specific and preferred embodiments of this invention the mobile platform apparatus includes an electric signal light to show whether or not the truck is restrained in the hook mechanism, and also includes ground anchoring means to add to the strength of the platform apparatus in absorbing the impact of the truck and in preventing the truck from unintentionally separating from the mobile dock.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
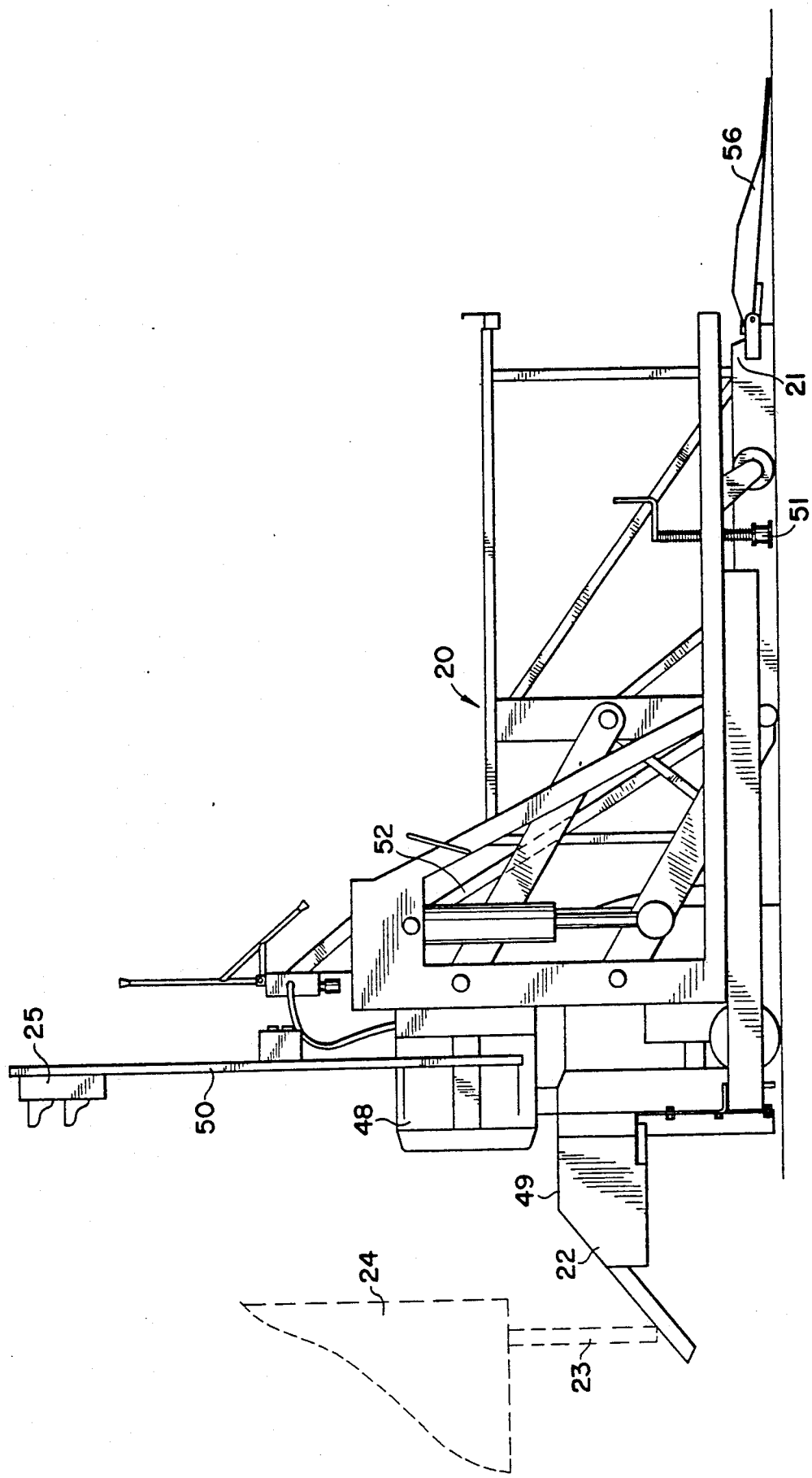
FIG. 1 is a side elevational view of the freight transfer dock of this invention.

This invention is best understood by reference to the attached drawings. In general the invention involves a mobile truck dock 20 with an elevatable platform 21 and with suitable means to receive and absorb the impact of a truck contacting the dock and to clamp the truck to the dock to prevent unintentional separation. The mobile dock which is employed here may be of any type or make, several of which are on the market today. Generally, these docks are of two types; a scissor framework such as that made and sold by Advance Autoquip and Bishamon; and a parallelogram framework such as that made and sold by Superior Handling Equipment, Inc. These docks have a rectangular platform supported on a load-bearing structure of beams, with the platform supported on a load-bearing structure of beams, with the platform power source being hydraulic cylinder systems. In the scissor framework, the platform is raised and lowered by two pairs of crossed lever arms on opposite sides of the platform and pivoted at their centers to operate like a pair of scissors. In the parallelogram framework the platform is raised and lowered by two pairs of parallel lever arms on opposite sides of the platform and pivoted at their ends such that the lever arms are always parallel to each other. The preferred type are those with the parallelogram framework because their strength and stability appears to be greater that that of the scissor-type.

The means for clamping a truck to the dock is usually spoken of as the "truck restraint" 22, and it includes a hook that is locked over the ICC bumper 23 of the truck 24. The ICC bumper 23 is a device depending downward from the rear of the truck body. It is a square cornered, U-shaped combination of two vertical beams and one horizontal beam, the vertical beams are rigidly attached to the underside of the truck frame at its rearmost extremity, and the horizontal beam merely joins the lower ends of the two vertical beams. This structure has been dubbed "ICC bumper" because it resulted from safety regulations of the Interstate Commerce Commission. The restraining means are generally of three sources; one being a DOK-LOK of the Rite-Hite Company, a second being the STAR Truk Stop of the Kelley Company and the third being a Serco restraint.

Each device has a hook which is released manually or electrically when a truck 24 with an ICC bumper 23 backs into the dock, and the hook is locked around the horizontal beam of the ICC bumper 23 as long as the truck 24 is in the dock. An electric signal 25 is normally included which tells the truck driver not to put the truck into gear until the signal shows the hook to be unlatched from the truck.

In the present invention the truck restraint is attached to a mobile truck dock 20 for the same purpose; namely, to prevent unintentional separation of the truck 24 from the dock 20, which would, if separation occurred, result in a dangerous gap into which freight handlers might fall. Truck restraints have not been attached to mobile docks in the past because it would do little to prevent the truck from moving with the mobile dock attached. Nevertheless, it is important to tie the truck to the mobile dock so as to prevent separation of the two while freight is being loaded or unloaded.

It is preferred, however, to combine a mobile dock with a truck restraint, and with anchor means 26 to prevent the truck from moving the mobile dock 20 attached. The anchor means 26 preferably involve an immovable object attached to, or buried in the ground. One embodiment is that shown in FIGS. 4–7, wherein a surface anchor is employed. The anchor has a base plate 27 which is bolted to nuts 28 that are buried in concrete in the ground. Instead of the nuts being buried, it is entirely feasible to bury the bolt in the concrete and attach nuts to the threaded ends projecting through bolt holes in base plate. Projecting vertically upward from base plate 27 is main plate 29 to which are attached flanges 30. The end supports 32 of vertical plate may be thicker than vertical plate or may be shaped like a structural beam to provide extra strength. Flange 30 is placed over the top of a horizontal beam 31 or into a special projection on the lower part of the mobile truck dock. Base plate 27 is then drawn tightly against the ground 33 by bolts or nuts 28 causing the mobile dock to be clamped against the ground level or surface of the concrete slab. This provides a good anchor to absorb impact from the truck and/or to prevent the truck from pulling away from the restraint before it was unlocked. This is not the most secure of the ground anchors described herein, but it is adequate for many situations.

A much more secure ground anchor system is shown in FIGS. 8–11 where a pair of tubular posts 34 are buried in an underground concrete mass 35. The posts 34 may be fitted with a plurality of lateral arms 36 which provide additional resistance to any force tending to pull tubular post 34 upward and out of its underground position. The lower framework of the mobile dock contains a sleeve 37 which is aligned with the axis of the tubular post 34. An anchor pin 38 is then placed through the sleeve 37 and into the hollow of the tubular post 34 tying the dock to the underground post. A flange 39 on the upper end of the anchor pin 38 prevents pin from falling too far into tubular post 34, and an eye 40 is also preferably included to facilitate removal of the pin 34, perhaps by the assistance of a cable passing through the eye 40 and upwards to secure attachment near sleeve 37. This arrangement provides good resistance to truck movement because of the very short moment resulting from sleeve 37 being very close (e.g., 1–6 inches) above ground level 33 at the top of tubular post 34.

Figure 12:
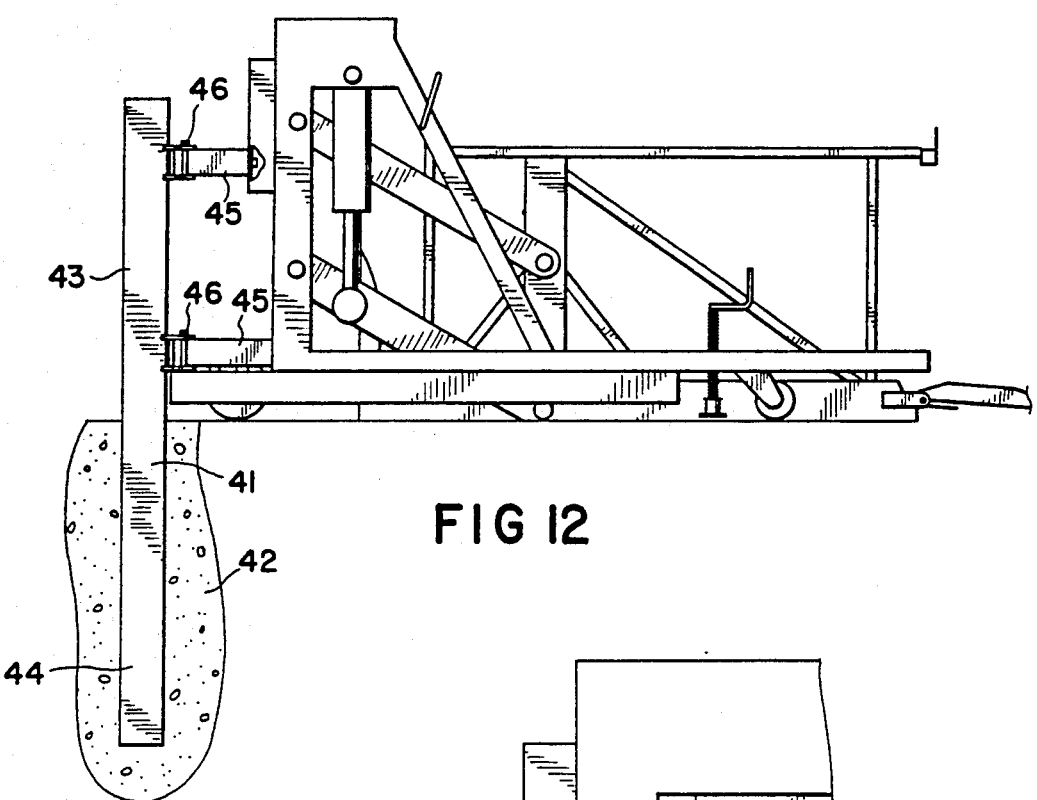
FIG. 12 is a side elevational view of the third embodiment of the ground anchor system used with this invention.
Figure 13:
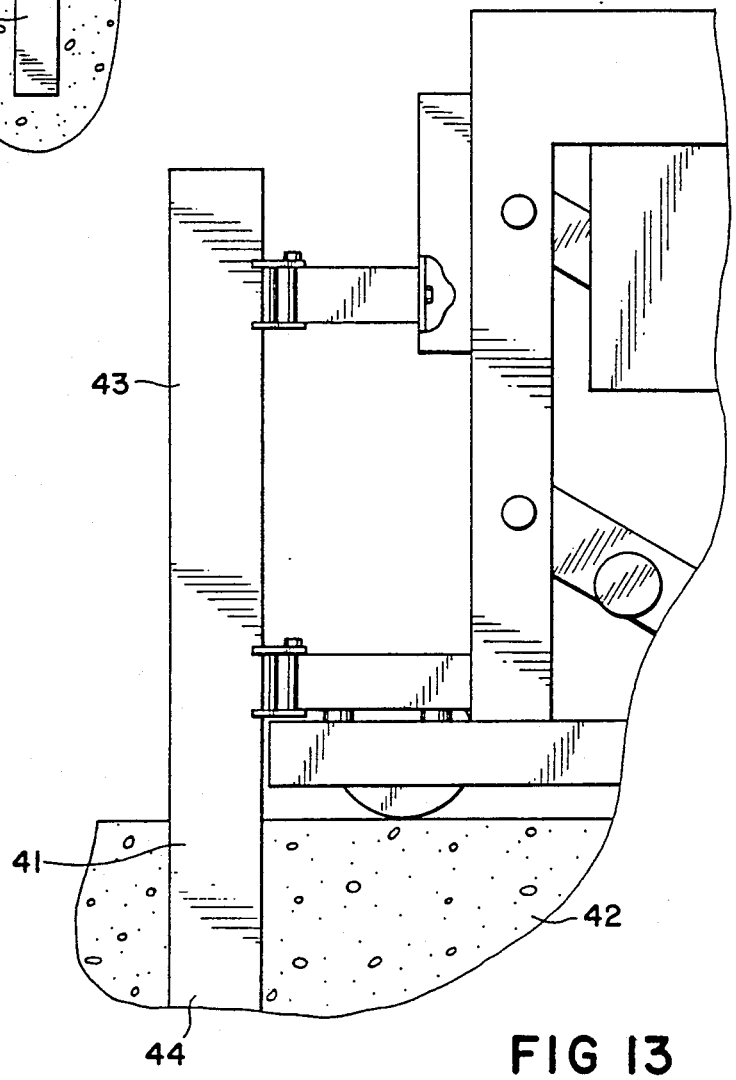
FIG. 13 is an enlarged side elevational view of the couplers employed in the system of FIG. 12.

A third embodiment of a ground anchor is shown in FIGS. 12–13 wherein a pair of solid vertical posts 41 are partially buried in the ground in a mass of concrete 42. The portion 44 of post 41 in the ground is preferably at least half of the total length of post 41. The portion 43 of post 41 above the ground is fitted with two vertically spaced connectors 45 to join the mobile dock to the posts 41. The spacing is whatever fits the framework of the mobile dock. At each connector a support for a pivot pin 46 is welded to the post. A connector link 45, which may be a beam, a tube, a rod, or a structure is attached to the mobile dock at one end and to the pivot pin 46 at the other end. The pivot pin 46 should be easily removable so as to provide ease in attaching to or detaching from the posts.

The components added to the mobile dock 20 include a dock bumper 48 set at a height from the ground to meet the horizontal bumper pads on the rear of tile truck. The dock bumper 48 is extended forward of the front of the dock sufficiently to make the restraint hook means properly engageable. The restraint means 22 shown is a DOK-LOK (mentioned above) which engages its slanting guide with the ICC bumper 23 on the truck 24 causing the body of the restraint 22 to move vertically downward on its track until the horizontal beam of the ICC bumper 23 rests on the middle of the horizontal top 49 of the restraint body 22. A hook means (inside the body) is then released to hook over and be locked in a closed position over the horizontal beam of the ICC bumper 23. There also is a communications mast 50 carrying a pair of signal lights 25 (red and green) and printed instructions readable by facing the mast or by looking at it through a rear view mirror instructing the driver not to move the truck until he sees a green light. The mast 50 and signal lights 25 may, of course, be separately standing and not a part of the mobile dock; this is optional. The mobile dock 20 may also have standards 51 that may be operated to support the dock on those standards rather than on wheels, and it usually is preferred to employ such standards whenever the dock is being used to load or unload a truck.

Figure 2:
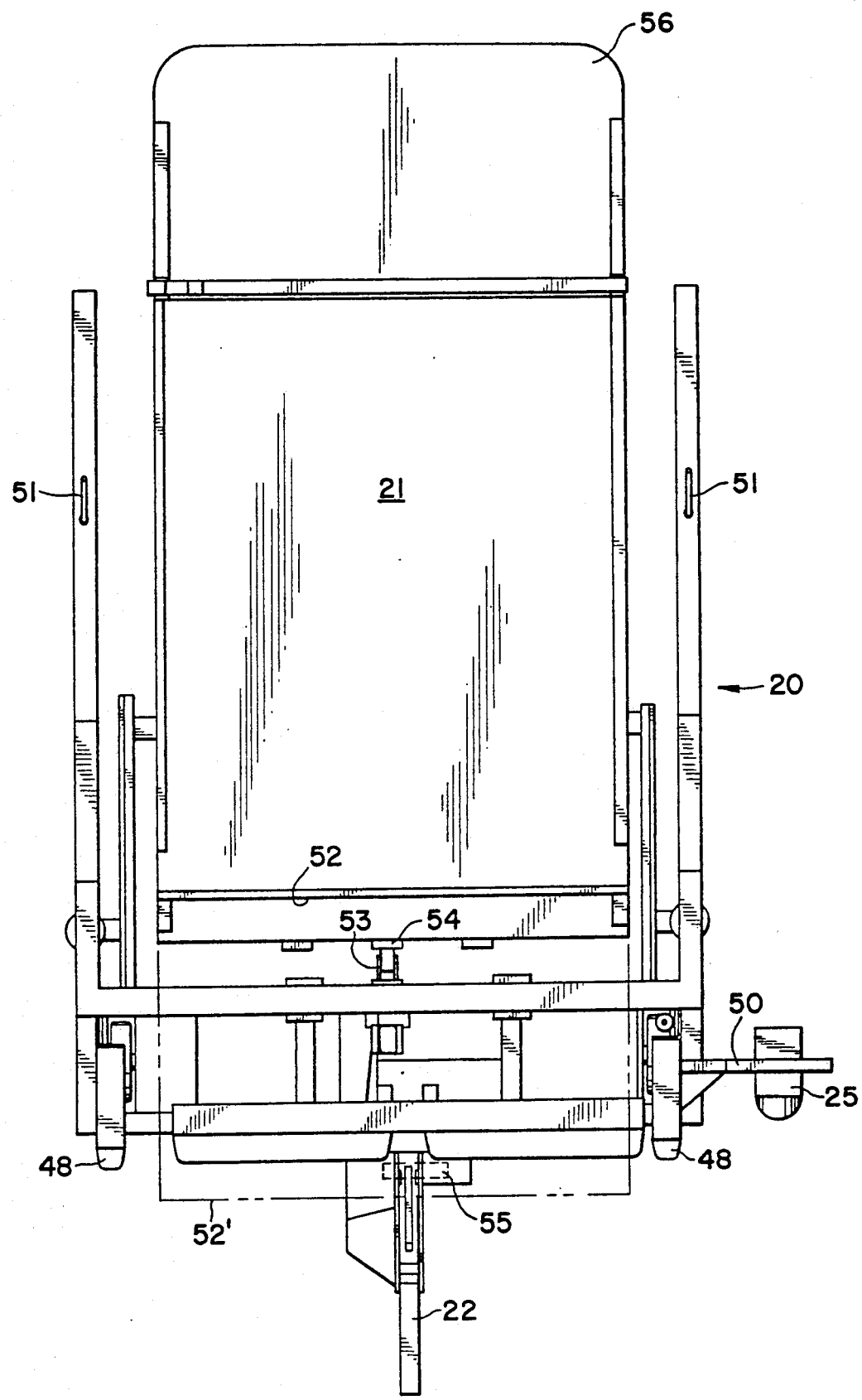
FIG. 2 is a top plan view of the freight transfer dock of this invention.
Figure 3:
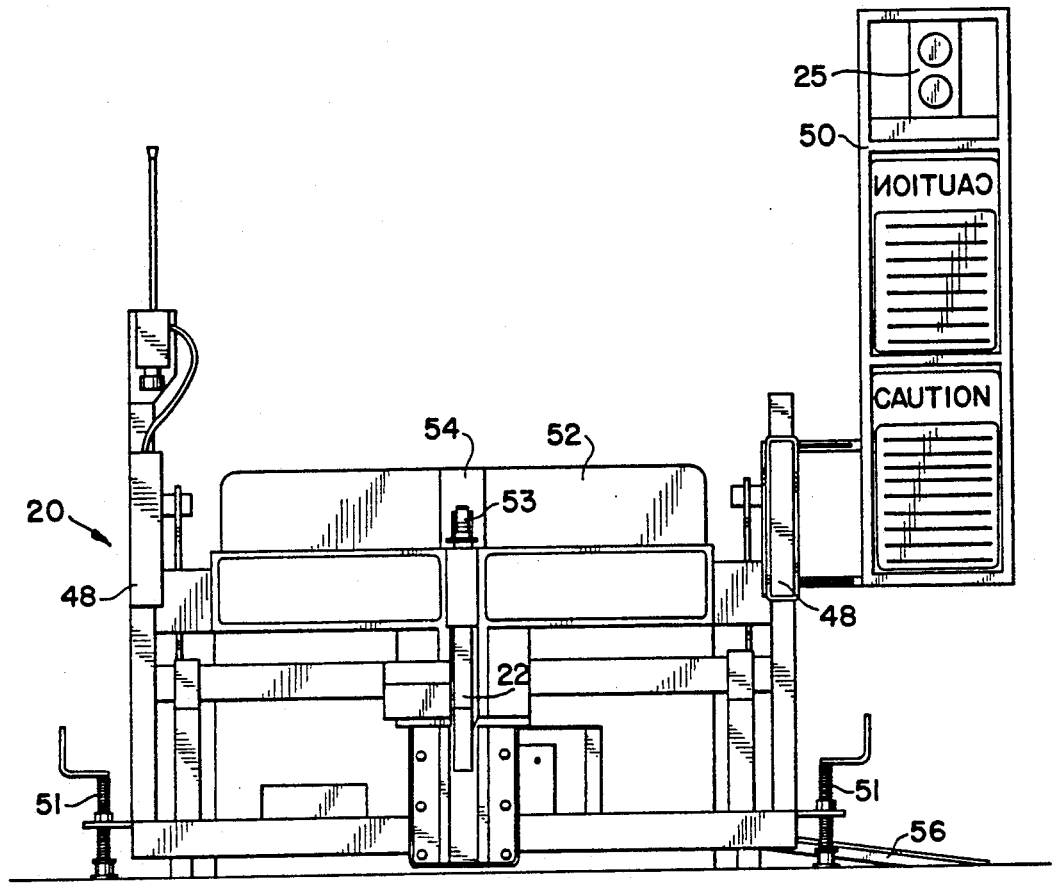
FIG. 3 is a front elevational view of the freight transfer dock of this invention.
Figure 6:
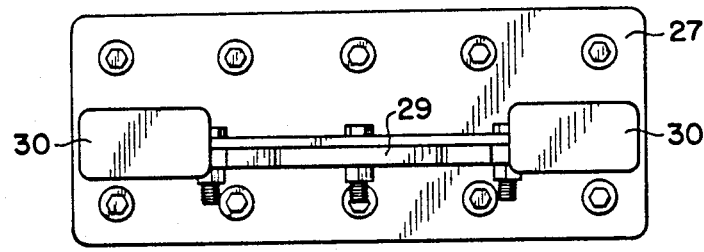
FIG. 6 is a top plan view of the clamp component of the ground anchor system of FIGS. 4 and 5.
Figure 7:
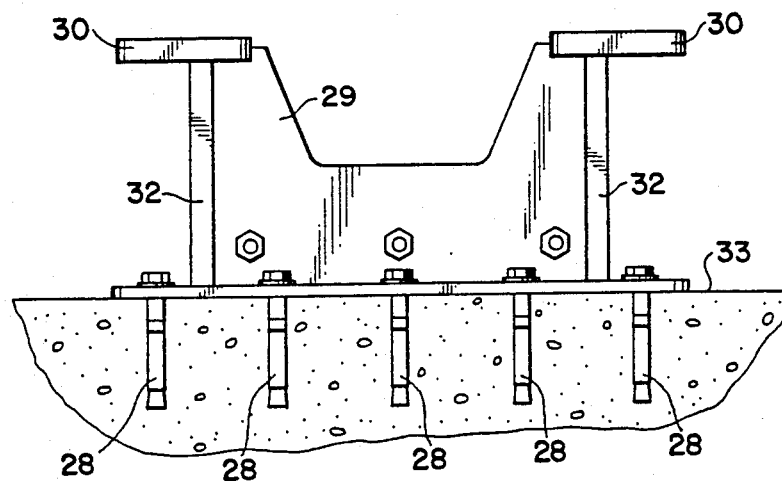
FIG. 7 is a side elevational view of the component of FIG. 6.
Figure 4:
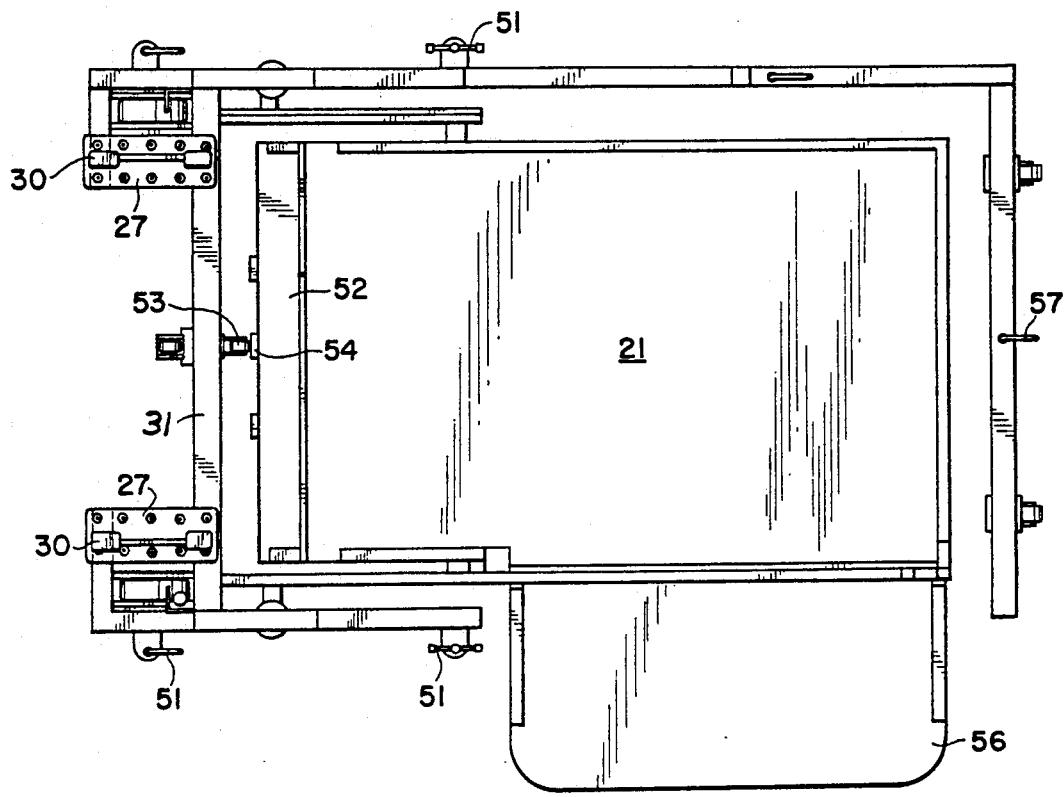
FIG. 4 is a top plan view of a first embodiment of a ground anchor system used with this invention.
Figure 5:
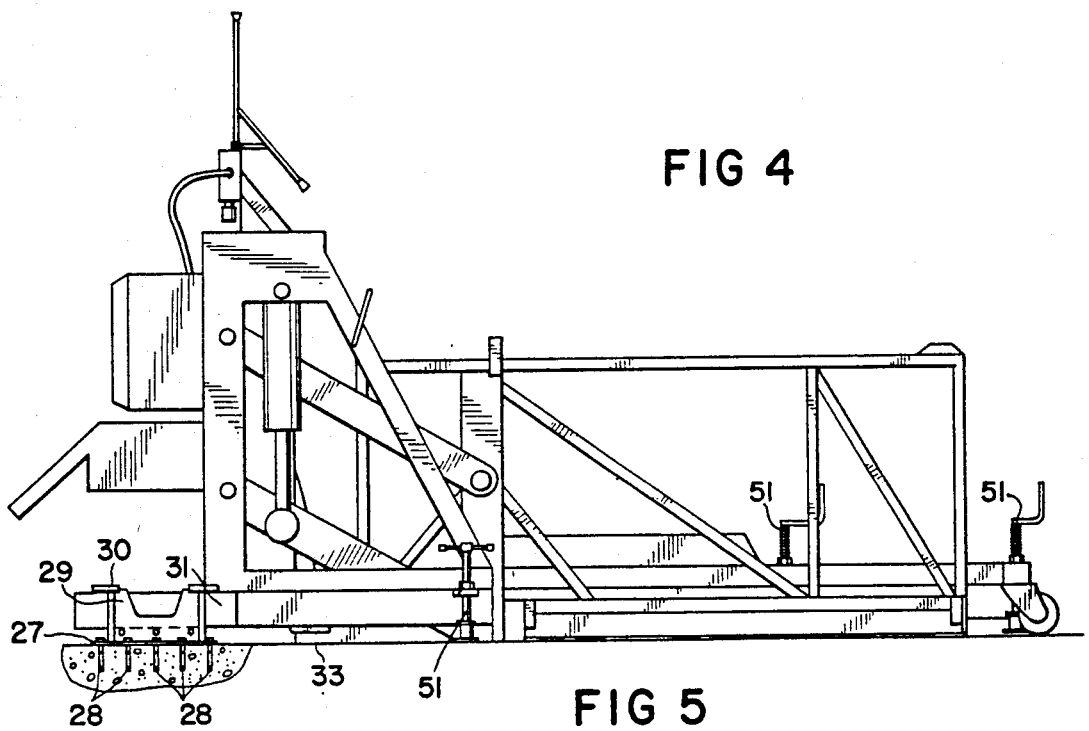
FIG. 5 is a side elevational view of the ground anchor system of FIG. 4.
Figure 8:
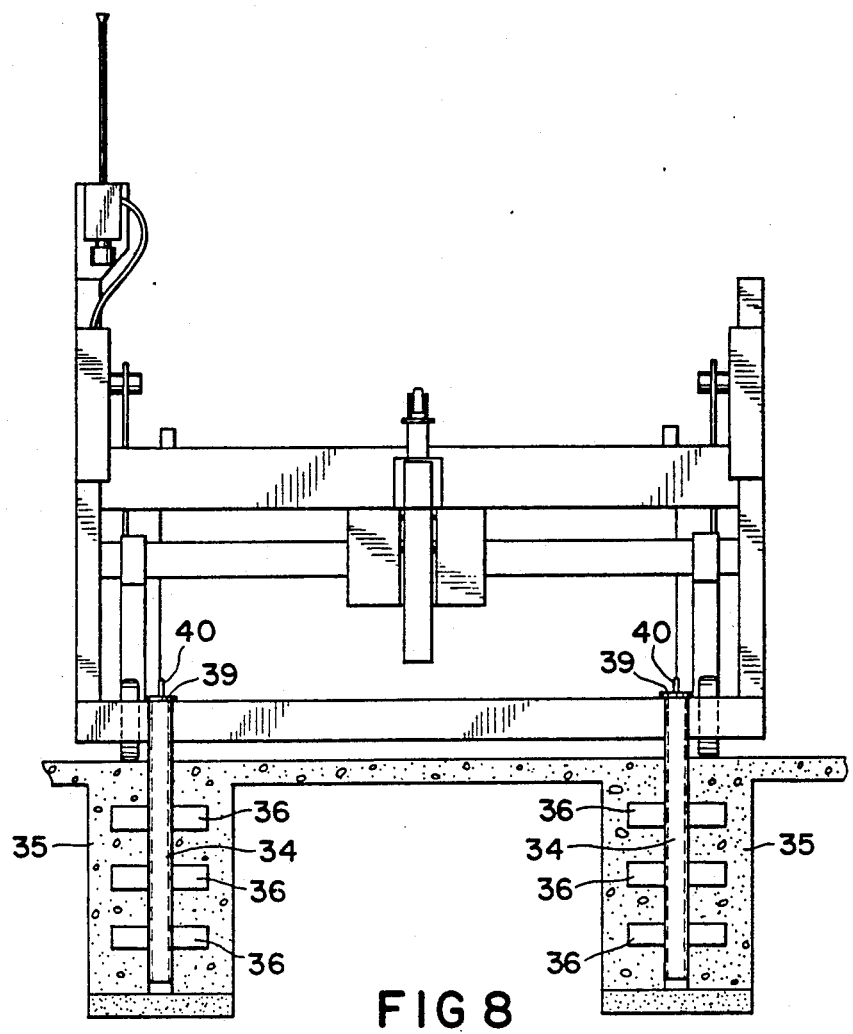
FIG. 8 is a front elevational view of a second embodiment of the ground anchor system used with this invention.
Figure 9:
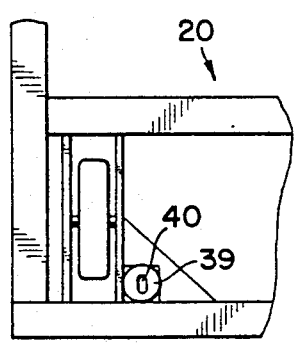
FIG. 9 is a top plan view of a portion of the system of FIG. 8.
Figure 10:
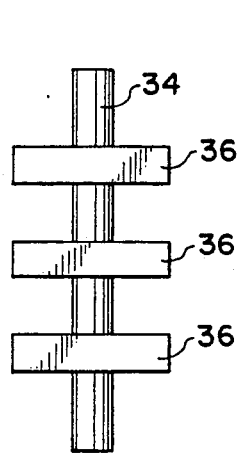
FIG. 10 is a front elevational view of the socket of the system of FIG. 8.
Figure 11:
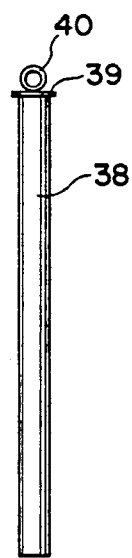
FIG. 11 is a front elevational view of the pin that cooperates with the socket of FIG. 10.

The mobile dock 20 has an elevatable platform 21 to which is pivoted a bridge plate 52 that rests vertically inside dock 20 when platform 21 is lowered. When platform 21 is elevated bridge plate 52 pivots to a horizontal position 52' as shown in FIG. 2 to connect the truck bed to the platform 21. Plate 52 may have one or more tracks 54 that contact one or more rollers 53 to steady the plate 52 as it is pivoted to a horizontal position. Bridge plate 52 is pierced with one or more slots 55 to permit an operator to stand on plate 52 in its horizontal position and extend a pusher/puller rod through the slot 55 to manually manipulate the truck restraint mechanism 22 to lock or unlock the hook which restrains the truck.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a mobile freight transfer dock for trucks having an ICC bumper and wherein the dock is a mobile elevatable platform apparatus including a front side with a first folding bridge adapted to form an access walkway between the truck and the platform and having another apparatus side with a second folding bridge adapted to form an access walkway from the platform to a freight assembly surface, the improvements which comprise (1) a truck impact absorbing bumper attached to the front side of said apparatus and adapted to receive the impact of a docking truck; (2) a truck restraining hook mechanism attached to the front side of said apparatus and adapted to grasp the ICC bumper of said truck; and (3) a ground anchor means adapted to absorb impact forces of said truck contacting said freight transfer dock, and to provide additional restraining force preventing the truck from premature separation from the hook mechanism, said ground anchor means including a plurality of posts with a first portion of the post length buried in the ground and a second portion of the post length extending upwardly above the ground, with said second portion including two vertically spaced pivot pins attached to horizontal connectors attachable to the front side of said platform apparatus.

2. In a mobile freight transfer dock for trucks having an ICC bumper and wherein the dock is a mobile elevatable platform apparatus including a front side with a first folding bridge adapted to form an access walkway between the truck and the platform and having another apparatus side with a second folding bridge adapted to form an access walkway from the platform to a freight assembly surface, the improvement which comprises a truck impact absorbing bumper and a truck restraining hook mechanism attached to the front side of said apparatus and adapted, respectively, to receive the impact of a docking truck and to grasp the ICC bumper of said truck; said first folding bridge comprising a plate pivotally attached to said elevatable platform adjacent said truck restraining hook mechanism and adapted to pivot to a horizontal position as said platform is elevated and to span over said hook mechanism to the bed of said truck, said plate being pierced by at least one slot adjacent said plate perimeter being directly above said hook mechanism when said plate is in position as a horizontal bridge, said slot being adapted to receive and guide an elongated rod member for manipulating the hook of said hook mechanism.

* * * * *